J. FITZSIMMONS.
END MILL.
APPLICATION FILED AUG. 27, 1919.
1,354,097.
Patented Sept. 28, 1920.
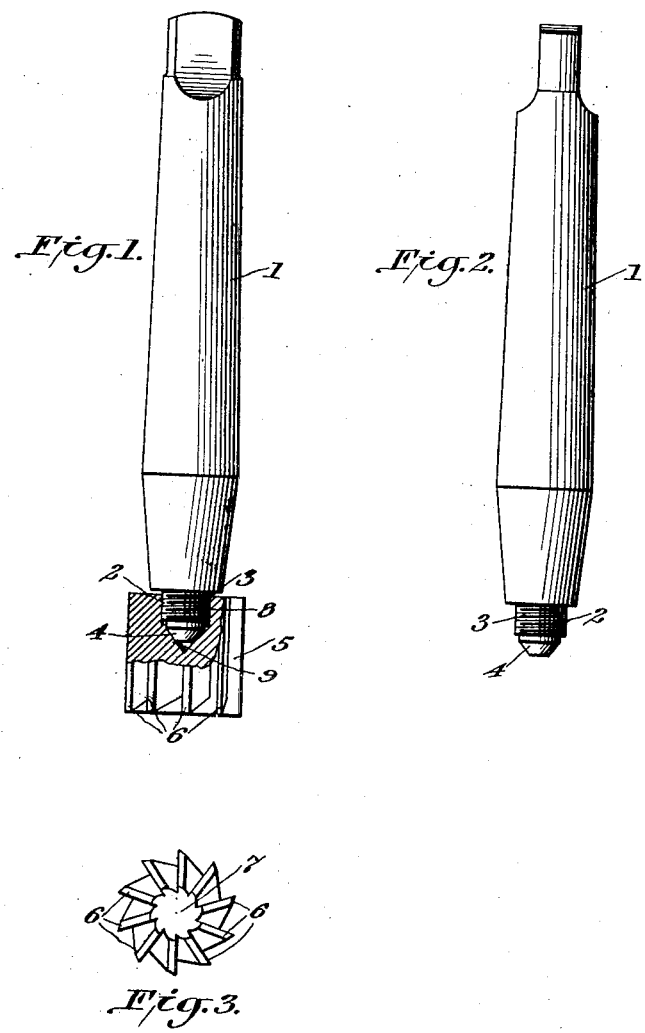

UNITED STATES PATENT OFFICE.

JAMES FITZSIMMONS, OF BALDWIN, NEW YORK.

END-MILL.

1,354,097.  Specification of Letters Patent.  Patented Sept. 28, 1920.

Application filed August 27, 1919. Serial No. 320,144.

*To all whom it may concern:*

Be it known that I, JAMES FITZSIMMONS, a citizen of the United States of America, residing at Baldwin, Nassau county, New York, have invented certain new and useful Improvements in End-Mills, of which the following is a specification.

My invention has as its object the provision of an end-mill with a detachable cutter and so arranged that when the cutter is fast on the shank, the cutter will run true. In the prior art it has been the practice to make the end-mill and shank integral and of hardened steel of the same character throughout. This practice results, when the cutting element is worn past resharpening or broken beyond repair, in the discarding of the whole tool with consequent loss of valuable material and increased expense in providing an entire new tool.

In my new detachable end-mill the cutter element is readily detached from the shank thus necessitating the replacing of the cutter element only or vice versa, saving both expense and trouble. All shanks and cutters of the same size may be made interchangeable and in some cases cutters of different sizes may be used with the same shank. As it costs less to make a cutter or a shank than it does to make them both as an integral unit, a supply of each may be kept on hand ready for replacement should necessity arise, thus saving the time of the operator as well as the expense of an entire new tool.

In the following, in connection with the accompanying drawing, I have described my new improvement, Figure 1 of the drawing being an elevation of the assembled shank and cutter, parts being shown in section; Fig. 2 an elevation of the shank detached and Fig. 3 a bottom end view of the cutter detached.

Similar numerals of reference indicate similar parts throughout the several views.

1 indicates the shank which may be made of any suitable metal, such as relatively soft steel, unhardened, and provided at one end with the usual means for holding the same in the tool holder and at the other with a stem 2, screw threaded adjacent the shank, as at 3, and preferably in the form of a truncated cone at the opposite end, as at 4.

5 indicates the cutter element, preferably of hard steel, provided with cutters 6. 6. and a running out opening 7 in the usual way. The inner face of the cutter is provided with a socket 8 for receiving the stem 2, of the shank. The socket is provided with screw threads (not shown) for coöperation with screw threads 3 on the stem 2 and is so shaped at its bottom portion 9, as to provide a surface to receive the truncated cone 4, of the stem and form contact therewith when the parts are screwed home.

The cone on the stem of the shank fitting accurately into the socket of similar shape in the cutter, provides means for lining up the shank and cutter and making them run true. The drive is taken up partly by the cone but mostly by the screw threads, and the harder the drive, the tighter the threads screw up and the truer the cone lines up the parts. By truncating the conical end of the shank I secure a more perfect seating of it in the socket than could be otherwise obtained, and if the taper of the cone and socket are not exactly the same, this truncating will permit a true seating of the cone in the socket notwithstanding.

It is obvious that variations in structure, form and material may be made without departing from the spirit of the invention and I do not restrict myself to the details as shown and described further than the scope of the appended claims demand.

I claim

1. A detachable end-mill comprising a shank and a cutter element, the shank having a screw threaded stem terminating in a truncated cone and the cutter having a socket adapted to coöperate with the stem on the shank, substantially as described.

2. A detachable end-mill comprising a shank and a cutter element, the shank having a screw threaded stem terminating in a smooth inclined surface and the cutter having a socket adapted to coöperate with the stem on the shank, substantially as described.

JAMES FITZSIMMONS.

Signed in the presence of—
  GEO. A. DAVIS,
  EDWARD E. HAACK.